US011915656B2

(12) United States Patent
Kim

(10) Patent No.: US 11,915,656 B2
(45) Date of Patent: Feb. 27, 2024

(54) GATE DRIVER AND DISPLAY DEVICE INCLUDING THE SAME

(71) Applicant: LG Display Co., Ltd., Seoul (KR)

(72) Inventor: Taehwi Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/966,625

(22) Filed: Oct. 14, 2022

(65) Prior Publication Data

US 2023/0206853 A1 Jun. 29, 2023

(30) Foreign Application Priority Data

Dec. 29, 2021 (KR) ........................ 10-2021-0191658

(51) Int. Cl.
*G09G 3/3266* (2016.01)

(52) U.S. Cl.
CPC ... *G09G 3/3266* (2013.01); *G09G 2300/0852* (2013.01)

(58) Field of Classification Search
None
See application file for complete search history.

(56) References Cited

U.S. PATENT DOCUMENTS

| | | | | |
|---|---|---|---|---|
| 11,335,228 | B1 * | 5/2022 | Zhang | G09G 3/3225 |
| 2013/0249884 | A1 * | 9/2013 | Kim | G09G 3/3677<br>345/212 |
| 2019/0035322 | A1 * | 1/2019 | Kim | H01L 27/1225 |
| 2021/0183303 | A1 * | 6/2021 | Kim | G09G 3/32 |
| 2021/0225256 | A1 * | 7/2021 | Byun | G09G 3/20 |
| 2022/0335875 | A1 * | 10/2022 | Lai | G09G 3/3266 |
| 2022/0406248 | A1 * | 12/2022 | Ju | G11C 19/28 |

FOREIGN PATENT DOCUMENTS

KR 10-2021-0082904 A 7/2021

* cited by examiner

*Primary Examiner* — Nitin Patel
*Assistant Examiner* — Amen W Bogale
(74) *Attorney, Agent, or Firm* — Seed IP Law Group LLP

(57) ABSTRACT

According to an aspect of the present disclosure, there is provided a gate driver and a display device. The display device includes: a display panel having a plurality of sub-pixels defined thereon, the sub-pixels being connected to a plurality of scan lines; and a gate driver comprising a plurality of stages for supplying first and second scan signals to each of the plurality of scan lines. Each of the plurality of stages may include: a first output unit for outputting the first scan signal; a second output unit for outputting the second scan signal; a logic unit connected to the first output unit and the second output unit; a low-clock signal line connected to the logic unit; and a high-clock signal line connected to the second output unit. Therefore, a first and a second scan signal can be output from a single stage, so that the structure of the gate driver can become simpler.

14 Claims, 5 Drawing Sheets

GATE DRIVER AND DISPLAY DEVICE INCLUDING THE SAME

CROSS-REFERENCE TO RELATED APPLICATIONS

This application claims priority to Korean Patent Application No. 10-2021-0191658 filed in the Korean Intellectual Property Office on Dec. 29, 2021, the disclosure of which is incorporated herein by reference in its entirety as if fully set forth herein.

BACKGROUND

Technical Field

The present disclosure relates to a display device and a display device including the same, and more particularly, to a gate driver that can control an n-type transistor and a display device including the same.

Description of the Related Art

Display devices employed by the monitor of a computer, a TV, a mobile phone or the like include an organic light-emitting display (OLED) that emits light by itself, and a liquid-crystal display (LCD) that requires a separate light source.

Such display devices find more and more applications, including computer monitors and televisions, as well as personal portable devices. Accordingly, research is ongoing to develop display devices having a larger display area with reduced volume and weight.

A display device may drive a plurality of sub-pixels using a gate driver supplying a scan signal and a data driver supplying a data voltage. Among these, the gate driver may be formed as a gate in panel (GIP), i.e., the gate drive IC may be incorporated into the display panel. Unfortunately, the circuit of the sub-pixels may become complicated depending on the driving scheme of display devices or the internal compensation manner of the sub-pixels. As a result, the elements and area of the gate driver for driving the sub-pixels may increase, making it difficult to reduce the bezel area.

BRIEF SUMMARY

The present disclosure provides a gate driver that can output a first scan signal and a second scan signal and a display device including the same.

The present disclosure provides a gate driver that can output a first scan signal and a second scan signal in a single stage and a display device including the same.

The present disclosure provides a gate driver that can output a second scan signal using the existing output timing of a first scan signal and a display device including the same.

The present disclosure provides a gate driver that can output a scan signal to control an n-type transistor and a display device including the same.

The present disclosure provides a display device with reduced bezel area by simplifying the configuration of a gate driver.

The present disclosure provides a display device including a gate driver with a simpler structure as a first output unit for outputting a first scan signal and a second output unit for outputting a second scan signal share a single logic unit.

Technical benefits of the present disclosure are not limited to those above-mentioned, and other technical benefits, which are not mentioned above, can be clearly understood by those skilled in the art from the following descriptions.

According to an aspect of the present disclosure, there is provided a display device including: a display panel having a plurality of sub-pixels defined thereon, the sub-pixels being connected to a plurality of scan lines and a plurality of data lines; and a gate driver comprising a plurality of stages for supplying first and second scan signals at a high-level to each of the plurality of scan lines. Each of the plurality of stages may include: a first output unit for outputting the first scan signal; a second output unit for outputting the second scan signal; a logic unit connected to the first output unit and the second output unit; a low-clock signal line for outputting a low-clock signal at a low-level and connected to the logic unit; and a high-clock signal line for outputting a high-clock signal at a high-level and connected to the second output unit. According to an example embodiment of the present disclosure, a first scan signal and a second scan signal can be output from a single stage, so that the structure of the gate driver can become simpler and the bezel area can be reduced.

According to another aspect of the present disclosure, there is provided a gate driver comprising a plurality of stages, each being configured to supply first and second scan signals and comprising: a first transistor having a gate electrode connected to a Q node, and a source electrode and a drain electrode connected between a second gate-low line and a first output terminal from which the first scan signal is output; a second transistor having a gate electrode connected to a QB node, and a source electrode and a drain electrode connected between a gate-high line and the first output terminal; a third transistor having a gate electrode connected to a low-clock signal line and a source electrode and a drain electrode connected between the Q node and the first output terminal of a previous stage among the plurality of stages; a fourth transistor having a gate electrode connected to the Q node, and a source electrode and a drain electrode connected between the second gate-low line and the QB node; a fifth transistor having a source electrode and a drain electrode connected between the gate-high line and the QB node; a sixth transistor having a gate electrode connected to the first output terminal, and a source electrode and a drain electrode connected between a first gate-low line and a second output terminal from which the second scan signal is output; and a seventh transistor having a gate electrode connected to a QN node, and a source electrode and a drain electrode connected between a high-clock signal line and the second output terminal, wherein the QN node is electrically connected to the QB node, wherein the first transistor, the second transistor, the third transistor, the fifth transistor, the six transistor and the second transistor are p-type transistors, and the fourth transistor is an n-type transistor.

Other detailed matters of the example embodiments are included in the detailed description and the drawings.

According to an example embodiment of the present disclosure, a first scan signal and a second scan signal can be output from a single stage of a gate driver.

According to an example embodiment of the present disclosure, a second scan signal can be output using the existing output timing of a first scan signal, so that the driving method can become simpler.

According to an example embodiment of the present disclosure, a first output unit for outputting a first scan signal and a second output unit for outputting a second scan signal share a single logic unit, so that the structure of the gate driver can become simpler.

According to an example embodiment of the present disclosure, the bezel area can be reduced by simplifying the circuit configuration for outputting the first scan signal and the second scan signal.

According to an example embodiment of the present disclosure, a high-level scan signal can be output to control an n-type transistor.

The effects according to the present disclosure are not limited to the contents exemplified above, and more various effects are included in the present specification.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
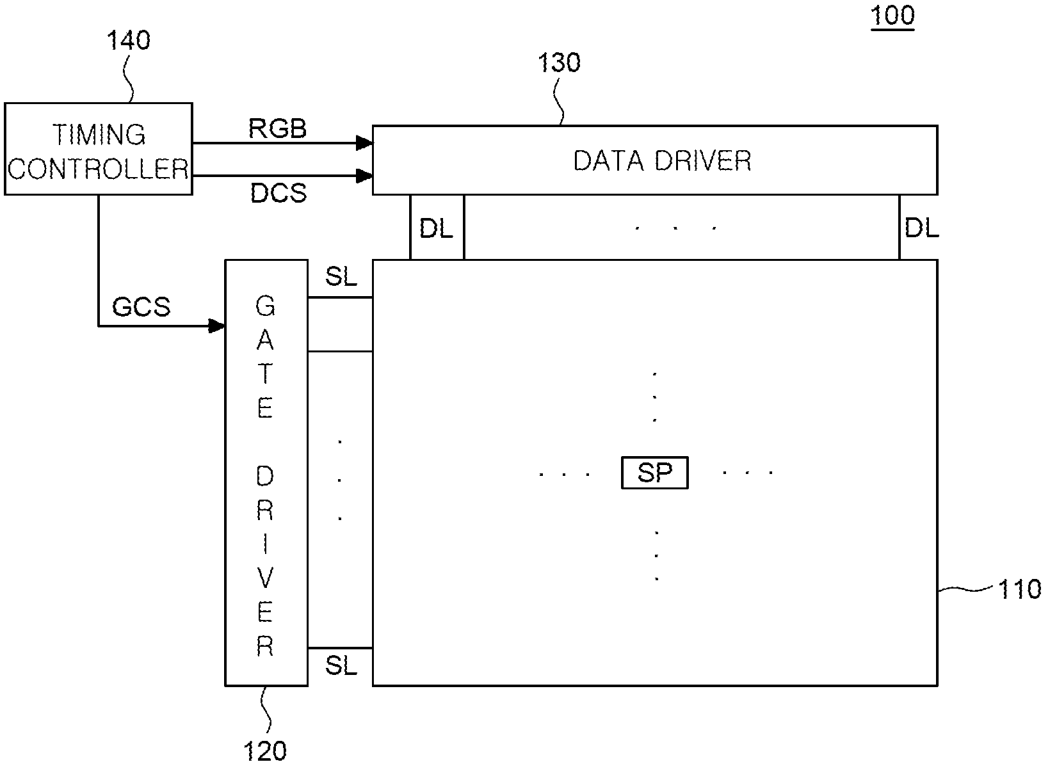
FIG. 1 is a schematic block diagram of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Reference will now be made in detail to embodiments of the present disclosure, examples of which are illustrated in the accompanying drawings. Wherever possible, the same reference numbers may be used throughout the drawings to refer to the same or like parts.

Hereinafter, a display device according to example embodiments of the present disclosure will be described in detail with reference to accompanying drawings.

FIG. 1 is a schematic block diagram of a display device according to an example embodiment of the present disclosure. FIG. 1 shows only a display panel 110, a gate driver 120, a data driver 130 and a timing controller 140 among a variety of elements of the display device 100 for convenience of illustration.

Referring to FIG. 1, the display device 100 includes a display panel 110 including a plurality of sub-pixels SP, a gate driver 120 and a data driver 130 that supply a variety of signals to the display panel 110, and a timing controller 140 that controls the gate driver 120 and the data driver 130.

The gate driver 120 supplies scan signals to a plurality of scan lines SL according to a plurality of gate control signals GCS provided from the timing controller 140. Although one gate driver 120 is disposed on one side of the display panel 110 and spaced apart from it in the example shown in FIG. 1, the number and location of the gate driver 120 are not limited thereto.

The data driver 130 converts image data RGB input from the timing controller 140 into data voltage using a gamma voltage in response to the data control signals DCS issued from the timing controller 140. The data driver 130 may receive the gamma voltages from a gamma unit, may select a gamma voltage corresponding to the gray level of the image data RGB from among the gamma voltages to generate a data voltage, and may apply the generated data voltage to a plurality of data lines DL.

The timing controller 140 aligns the image data RGB input from an external source and supplies it to the data driver 130. The timing controller 140 may generate a gate control signal GCS and a data control signal DCS using a synchronization signal input from an external source, e.g., a dot clock signal, a data enable signal, and a horizontal/vertical synchronization signal. In addition, the timing controller 140 supplies the gate control signal GCS and the data control signal DCS thus generated to the gate driver 120 and the data driver 130, respectively, to control the gate driver 120 and the data driver 130.

The display panel 110 is the element that displays images to a user and includes a plurality of sub-pixels SP. In the display panel 110, the plurality of scan lines SL and the plurality of data lines DL cross each other, and the sub-pixels SP are connected to the scan lines SL and the data lines DL.

Each of the sub-pixels SP is the minimum unit forming the screen, and several sub-pixels SP may be gathered to form a single pixel. Each of the plurality of sub-pixels SP includes a light-emitting element and a pixel circuit for driving the light-emitting element. The plurality of light-emitting elements may be defined differently depending on the type of the display panel 110. For example, where the display panel 110 is an organic light-emitting display panel, the light-emitting elements may be organic light-emitting elements each including an anode, an organic light-emitting layer, and a cathode. Besides, light-emitting diodes (LED) or quantum-dot light-emitting diodes (QLED) including quantum dots QD may be used as the light-emitting elements.

Hereinafter, a sub-pixel SP of the display device 100 according to the example embodiment of the present disclosure will be described in detail with reference to FIG. 2.

Figure 2:
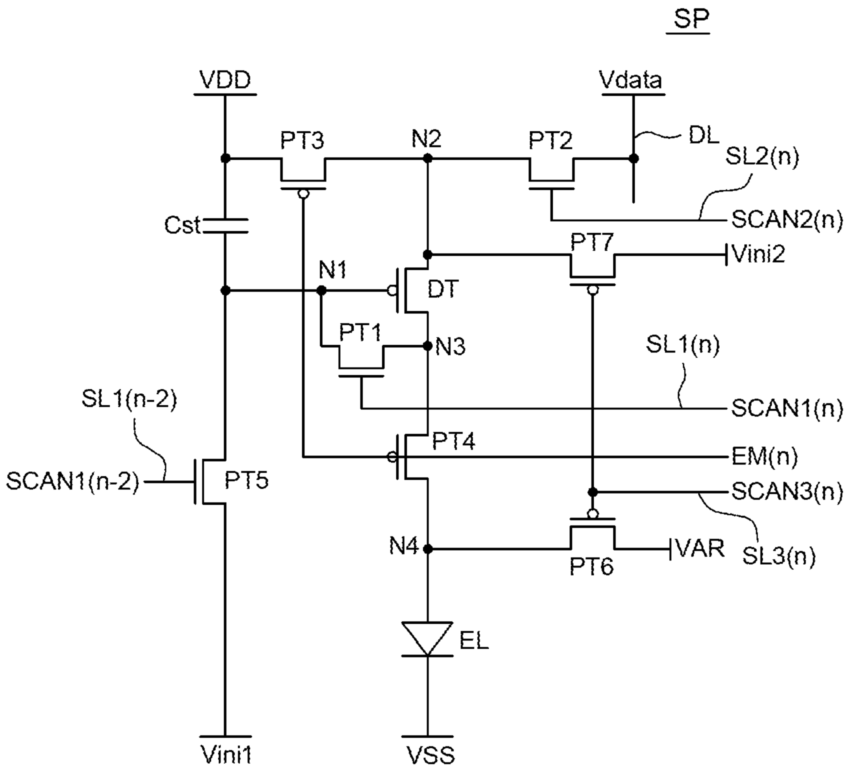
FIG. 2 is a circuit diagram of a sub-pixel of a display device according to an example embodiment of the present disclosure.

FIG. 2 is a circuit diagram of a sub-pixel of a display device according to an example embodiment of the present disclosure.

Referring to FIG. 2, a sub-pixel SP includes a light-emitting element EL, a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, a driving transistor DT and a storage capacitor Cst. The sub-pixel SP is connected to a data line DL, the plurality of scan lines SL, an emission control signal line, a first initialization line, a second initialization line, an anode reset line, a high potential power voltage line, and a low potential power voltage line.

In the following description, it is assumed that the sub-pixel SP is disposed in the $n^{th}$ row.

The sub-pixel SP includes a plurality of transistors. The plurality of transistors may be implemented as transistors of different types. One of the plurality of transistors may be a transistor including an oxide semiconductor or low-temperature polycrystalline oxide (LTPO) as an active layer. Since the oxide semiconductor material has a low off-current, it is suitable for a switching transistor that has a short turn-on time and a long turn-off time. For example, among the plurality of transistors, the first pixel transistor PT1 and the second pixel transistor PT2 may be transistors using an oxide semiconductor or low-temperature polycrystalline oxide as an active layer.

In particular, in order to drive the display device 100 at a low speed, some of the transistors of the sub-pixel SP may be implemented as oxide semiconductor transistors. Since the length of one frame in a low-speed driving is longer than the length of one frame in a high-speed driving, it is important to keep the voltage at each node of the sub-pixel SP constant. The oxide semiconductor transistor has a very low off-current, which is advantageous to hold the voltage at each node until the next frame. Accordingly, switching transistors such as the first pixel transistor PT1 and the second pixel transistor PT2 may be implemented as oxide semiconductor transistors, to easily hold the voltage at each node of the sub-pixel SP.

Another one of the plurality of transistors may be a transistor using low-temperature polysilicon (LTPS) as the active layer. Since the polysilicon material has high mobility, low power consumption, and excellent reliability, it may be suitable for the driving transistor DT and the like.

Incidentally, the plurality of transistors may be n-type transistors or p-type transistors. In an n-type transistor, electrons are carriers, and thus electrons may flow from the source electrode to the drain electrode, and electric current may flow from the drain electrode to the source electrode. In a p-type transistor, holes are carriers, and thus holes may flow from the source electrode to the drain electrode, and electric current may flow from the source electrode to the drain electrode. One of the plurality of transistors may be an n-type transistor, and another one of the plurality of transistors may be a p-type transistor.

For example, the first pixel transistor PT1 and the second pixel transistor PT2 may be n-type transistors and transistors using an oxide semiconductor as the active layer. The fifth pixel transistor PT5 may be an n-type transistor and a transistor including low-temperature polysilicon as the active layer. In addition, the driving transistor DT, the third pixel transistor PT3, the fourth pixel transistor PT4, the sixth pixel transistor PT6 and the seventh pixel transistor PT7 may be p-type transistors and may be transistors including low-temperature polysilicon as the active layers. However, the materials forming the active layers of the plurality of transistors and the types of the plurality of transistors are merely illustrative and not limiting.

The first pixel transistor PT1 includes a gate electrode, a source electrode, and a drain electrode. The gate electrode of the first pixel transistor PT1 is connected to the first scan line SL1($n$) of the $n^{th}$ row, and the source electrode and the drain electrode are connected between a first node N1 and a third node N3. The first pixel transistor PT1 may connect the first node N1 with the third node N3 based on the first scan signal SCAN1($n$) of the first scan line SL1($n$) in the $n^{th}$ row.

The second pixel transistor PT2 includes a gate electrode, a source electrode, and a drain electrode. The gate electrode of the second pixel transistor PT2 is connected to the second scan line SL2($n$) of the $n^{th}$ row, and the source electrode and the drain electrode are connected between the second node N2 and the data line DL. The second pixel transistor PT2 may transmit the data voltage Vdata from the data line DL to the second node N2 based on the second scan signal SCAN2($n$) of the second scan line SL2($n$) in the $n^{th}$ row.

The third pixel transistor PT3 includes a gate electrode, a source electrode, and a drain electrode. The gate electrode of the third pixel transistor PT3 is connected to the emission control signal line in the $n^{th}$ row, and the source electrode and the drain electrode are connected between the high potential power voltage line and the second node N2. The third pixel transistor PT3 may transmit the high potential power voltage VDD to the second node N2 based on the emission control signal EM(n) from the emission control signal line in the $n^{th}$ row.

The fourth pixel transistor PT4 includes a gate electrode, a source electrode, and a drain electrode. The gate electrode of the fourth pixel transistor PT4 is connected to the emission control signal line in the $n^{th}$ row, and the source electrode and the drain electrode are connected between the third node N3 and the fourth node N4. The fourth pixel transistor PT4 may transmit a driving current from the driving transistor DT to the light-emitting element EL based on the emission control signal EM(n) from the emission control signal line in the $n^{th}$ row.

The fifth pixel transistor PT5 includes a gate electrode, a source electrode, and a drain electrode. The gate electrode of the fifth pixel transistor PT5 is connected to the first scan line SL1(*n*−2) in the $(n-2)^{th}$ row, and the source electrode and the drain electrode are connected between the first initialization line and the storage capacitor Cst and between the first initialization line and the first node N1. The fifth pixel transistor PT5 may transmit a first initialization voltage Vini1 of the first initialization line to the storage capacitor Cst and the first node N1 based on the first scan signal SCAN1(*n*−2) of the first scan line SL1(*n*−2) in the $(n-2)^{th}$ row.

The sixth pixel transistor PT6 includes a gate electrode, a source electrode, and a drain electrode. The gate electrode of the sixth pixel transistor PT6 is connected to the third scan line SL3(*n*) of the $n^{th}$ row, and the source electrode and the drain electrode are connected between an anode reset line and the fourth node N4. The sixth pixel transistor PT6 may transmit an anode reset voltage VAR of the anode reset line to the fourth node N4 based on the third scan signal SCAN3(*n*) of the third scan line SL3(*n*) in the $n^{th}$ row. Accordingly, when the sixth pixel transistor PT6 is turned on, the anode of the light-emitting element EL and the fourth node N4 may be initialized to the anode reset voltage VAR.

The seventh pixel transistor PT7 includes a gate electrode, a source electrode, and a drain electrode. The gate electrode of the seventh pixel transistor PT7 is connected to the third scan line SL3(*n*) of the $n^{th}$ row, and the source electrode and the drain electrode are connected between the second node N2 and the second initialization line. The seventh pixel transistor PT7 may transmit a second initialization voltage Vini2 of the second initialization line to the second node N2 based on the third scan signal SCAN3(*n*) of the third scan line SL3(*n*) in the $n^{th}$ row. At this time, the second initialization voltage Vini2 may be an on-bias stress voltage to apply on-bias stress.

By applying on-bias stress, the hysteresis of a transistor can be alleviated. A transistor may have a hysteresis in which characteristics of the transistor change in the current frame depending on the operation state in the previous frame. For example, even when the data voltage Vdata of the same voltage level is supplied to the driving transistor DT, driving currents of different levels may be generated depending on the operating state in the previous frame. Accordingly, by applying on-bias stress to the plurality of transistors, it is possible to initialize the characteristics of the transistors, i.e., the threshold voltage to a certain state. For example, the same on-bias stress may be applied to each of the plurality of sub-pixels SP, so that certain transistors of each of the plurality of sub-pixels SP may be initialized to the same state. Accordingly, all of the sub-pixels SP can emit light of the same luminance in the subsequent frame.

The driving transistor DT includes a gate electrode, a source electrode, and a drain electrode. The gate electrode of the driving transistor DT is connected to the first node N1, and the source electrode and the drain electrode are connected between the second node N2 and the third node N3. When the driving transistor DT is turned on, a driving current is supplied to the light-emitting element EL so that the light-emitting element EL can emit light.

The storage capacitor Cst includes a plurality of capacitor electrodes. Some of the capacitor electrodes are connected to the high potential power voltage line, while the other capacitor electrodes are connected to the first node N1. The storage capacitor Cst stores a voltage between the high potential power voltage VDD and a voltage of the gate electrode of the driving transistor DT so that the driving current from the driving transistor DT can be held while the light-emitting element EL emits light.

The light-emitting element EL includes an anode and a cathode. The anode of the light-emitting element EL is connected to the fourth node N4, and the cathode thereof is connected to a low potential power voltage line from which a low potential power voltage VSS is applied. The light-emitting element EL may emit light in proportion to the driving current from the driving transistor DT.

Incidentally, when the switching transistors such as the first pixel transistor PT1 and the second pixel transistor PT2 are turned off, the voltage at the nearby node may be distorted, resulting kick-back, i.e., the luminance cannot reach the target value. For example, when the second pixel transistor PT2 connected between the source electrode of the driving transistor DT and the data line DL is implemented as a p-type transistor, the data voltage Vdata may decrease due to kickback, and thus it may be difficult to output target luminance. In addition, when the display device 100 is driven in a high-temperature environment or a low-temperature environment, the distortion of the data voltage Vdata due to the kickback may become worse, and thus low-grayscale images may not be displayed normally.

In view of the above, in the display device 100 according to the example embodiment of the present disclosure, the second pixel transistor PT2 connected between the source electrode of the driving transistor DT and the data line DL is implemented as an n-type transistor, so that the data voltage Vdata may increase when the kickback occurs. The data voltage Vdata has a positive value, and luminance fluctuations may become worse when the data voltage Vdata decreases rather than when it increases. As the second pixel transistor PT2 is changed to an n-type transistor, the data voltage Vdata increases even if kickback occurs, so that the luminance fluctuations can be more improved than when a p-type transistor is used.

However, when the second pixel transistor PT2 is changed to an n-type transistor, the second scan signal SCAN2 output from the second scan line SL2 has be changed from a low level to a high level. To this end, in the display device 100 according to the example embodiment of the present disclosure, some elements are added to the existing stage for outputting the first scan signal SCAN1 with the first scan line SL1 in the configuration of the gate driver 120, so that a single stage for outputting the high-level first scan signal SCAN1 and second scan signal SCAN2 with the first scan line SL1 and the second scan line SL2, respectively, has been formed. In this manner, in the display device 100 according to the example embodiment of the present disclosure, the existing stage can be utilized without adding a new stage in the process of changing the second scan signal SCAN2 from the low level to the high level, so the gate driver 120 can be simplified.

Hereinafter, the gate driver 120 will be described with reference to FIGS. 3 to 5.

Figure 3:
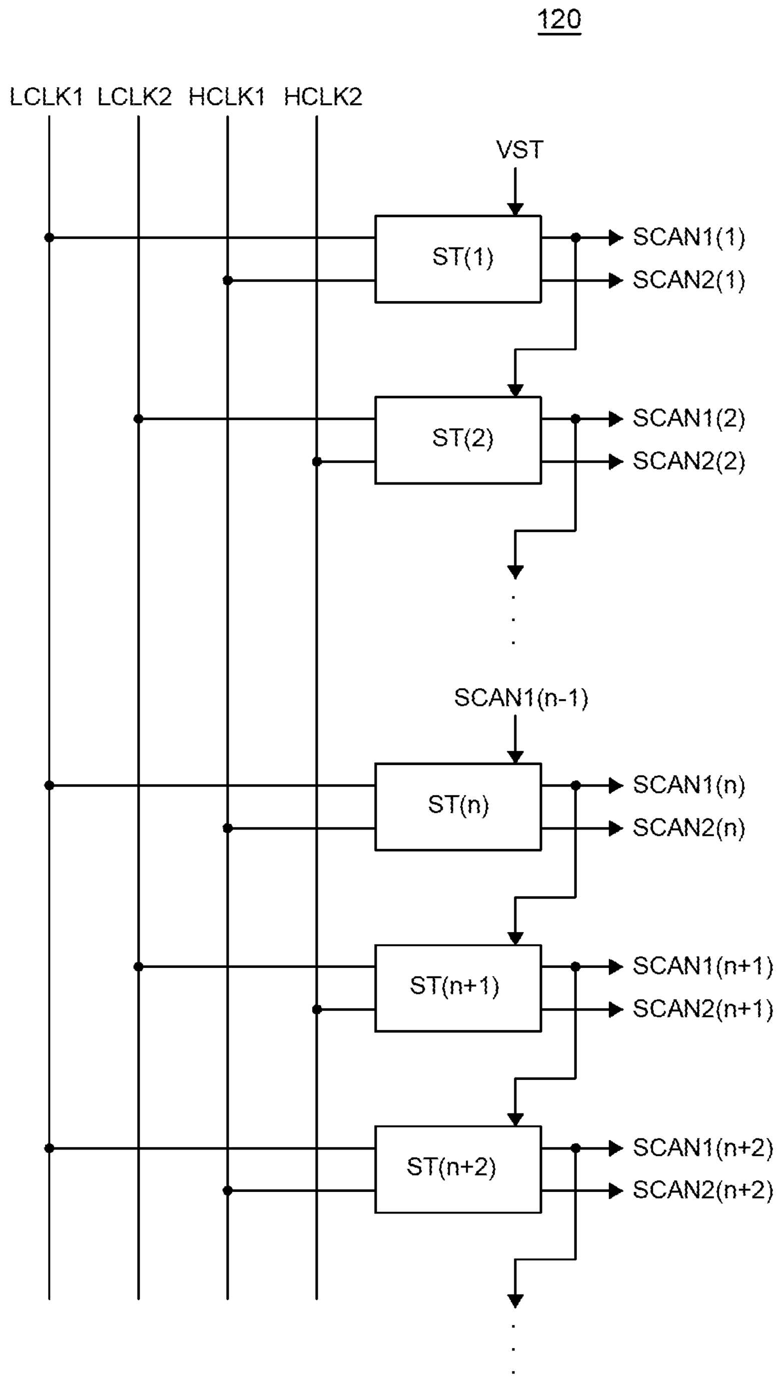
FIG. 3 is a block diagram of a gate driver of a display device according to an example embodiment.

FIG. 3 is a block diagram of a gate driver of a display device according to an example embodiment. FIG. 4 is a circuit diagram of a stage of a display device according to an example embodiment of the present disclosure. FIG. 5 is a timing diagram of a stage of a display device according to an example embodiment of the present disclosure.

Referring to FIG. 3, the gate driver 120 includes a plurality of stages ST, high-clock signal lines, and low-clock signal lines.

The plurality of stages ST generates a first scan signal SCAN1 and a second scan signal SCAN2. One stage ST may be connected to one first scan line SL1 and one second scan line SL2 to output a first scan signal SCAN1 and a second scan signal SCAN2.

The stages ST are cascaded. For example, the stages ST may be connected with one another, and one stage ST among the plurality of stages ST may generate a scan signal based on the first scan signal SCAN1 output from the previous stage ST. Since there is no previous stage ST for the uppermost stage ST(1), it may receive a separate start signal VST to generate the first scan signal SCAN1 and the second scan signal SCAN2.

The clock signal lines include a low-clock signal line including a first low-clock signal line and a second low-clock signal line, and a high-clock signal line including a first high-clock signal line and a second high-clock signal line. The low-clock signal line may be connected to a logic unit 121 of the stage ST, the high-clock signal line may be connected to a second output unit 123 of the stage ST. More detailed description thereon will be given later with reference to FIG. 4.

The first low-clock signal line and the second low-clock signal line of the low-clock signal lines are for outputting low-level clock signals. The first low-clock signal LCLK1 of the first low-clock signal line and the second low-clock signal LCLK2 of the second low-clock signal line may be output alternately.

The first high-clock signal line and the second high-clock signal line of the high-clock signal lines are for outputting high-level clock signals. The first high-clock signal HCLK1 of the first high-clock signal line and the second high-clock signal HCLK2 of the second high-clock signal line may be output alternately.

In addition, the odd-numbered stages ST among the plurality of stages ST are connected to the first low-clock signal line and the first high-clock signal line. The even-numbered stages ST among the plurality of stages ST are connected to the second low-clock signal line and the second high-clock signal line. For example, the first low-clock signal LCLK1 and the first high-clock signal HCLK1 may be input to the stage ST(n) of the $n^{th}$ row, and the second low-clock signal LCLK2 and the second high-clock signal HCLK2 may be input to the stage ST(n+1) of the $(n+1)^{th}$ row.

Hereinafter, among the plurality of stages ST, the stage ST(n) in the $n^{th}$ row to which the first low-clock signal LCLK1 and the first high-clock signal HCLK1 are input will be described as an example of the stages ST of the gate driver 120 of the display device 100 according to the example embodiment.

Figure 4:
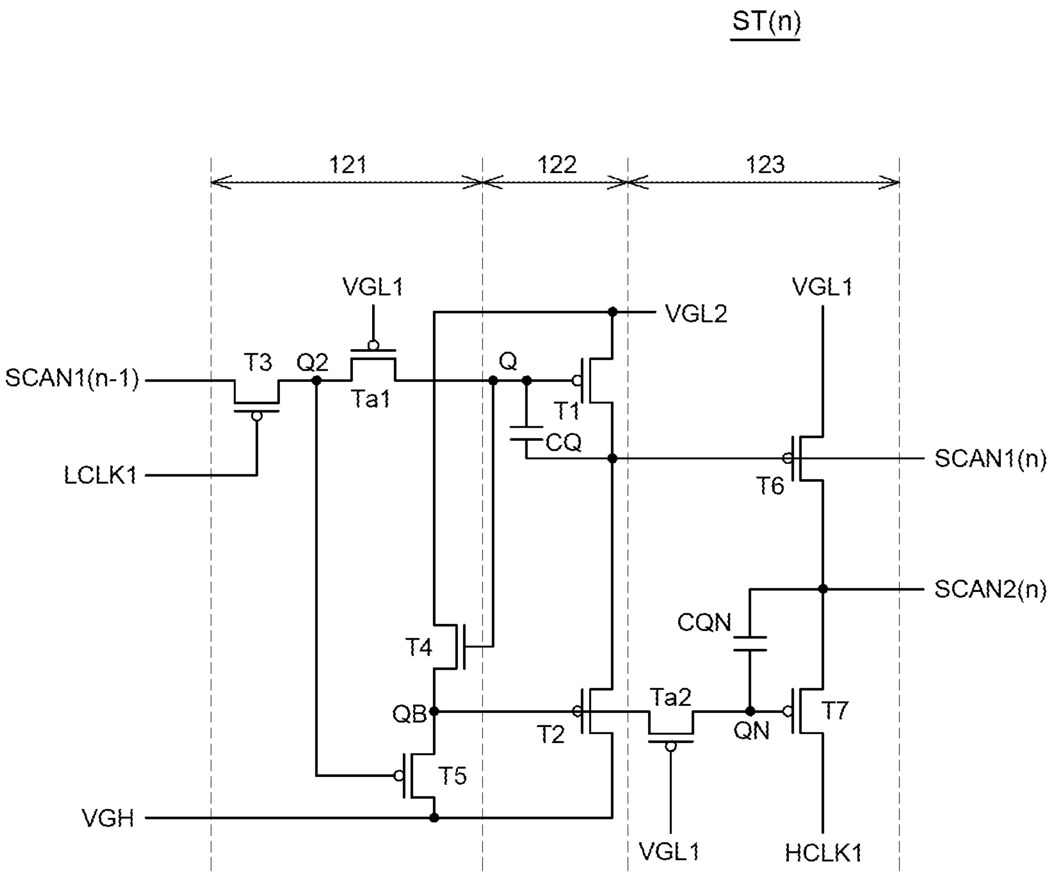
FIG. 4 is a circuit diagram of a stage of a display device according to an example embodiment of the present disclosure.

Referring to FIG. 4, the stage ST(n) includes a logic unit 121, a first output unit 122, and a second output unit 123. The logic unit 121 outputs a voltage for driving the first output unit 122 and the second output unit 123. The first output unit 122 may output the first scan signal SCAN1(*n*) to the first scan line SL1(*n*) based on the voltage output from the logic unit 121. The second output unit 123 may output the second scan signal SCAN2(*n*) to the second scan line SL2(*n*) based on the first scan signal SCAN1(*n*) output from the first output unit 122 and the voltage output from the logic unit 121.

The stage ST(n) includes a first transistor T1, a second transistor T2, a third transistor T3, a fourth transistor T4, a fifth transistor T5, a sixth transistor T6, a seventh transistor T7, a first auxiliary transistor Ta1, a second auxiliary transistor Ta2, a first capacitor CQ and a second capacitor CQN. The first transistor T1, the second transistor T2 and the first capacitor CQ may be included in the first output unit 122. The third transistor T3, the fourth transistor T4, the fifth transistor T5 and the first auxiliary transistor Ta1 may be included in the logic unit 121. The sixth transistor T6, the seventh transistor T7, the second auxiliary transistor Ta2 and the second capacitor CQN may be included in the second output unit 123.

In the following description, only the fourth transistor T4 among the plurality of transistors of the stage ST(n) is an n-type oxide semiconductor transistor while the other transistors are p-type low-temperature polysilicon transistors. It should be understood, however, that the present disclosure is not limited thereto.

The first transistor T1 of the first output unit 122 includes a gate electrode, a source electrode, and a drain electrode. The gate electrode of the first transistor T1 is connected to a Q node, and the source electrode and the drain electrode thereof are connected between the second gate-low line from which the second gate-low voltage VGL2 is output and the first output terminal from which the first scan signal SCAN1 (*n*) is output. The first transistor T1 may be turned on when the first scan signal SCAN1(*n*) is not output to transmit the second gate-low voltage VGL2 to the first output terminal.

The second transistor T2 of the first output unit 122 includes a gate electrode, a source electrode, and a drain electrode. The gate electrode of the second transistor T2 is connected to a QB node, and the source electrode and the drain electrode thereof are connected between a gate-high line from which a gate-high voltage VGH is output and the first output terminal. The second transistor T2 may be turned on by the voltage at the QB node to transmit the gate-high voltage VGH to the first output terminal, and the gate-high voltage VGH may be output as the first scan signal SCAN1 (*n*).

The first capacitor CQ of the first output unit 122 is connected between the Q node and the first output terminal. The first capacitor CQ may store the voltage at the Q node. While the first scan signal SCAN1(*n*) is output, the voltage associated with the high-level first scan signal SCAN1(*n*−1) output from the previous stage ST(n−1) may be stored at the first capacitor CQ, so that the first transistor T1 may remain turned off.

The third transistor T3 of the logic unit 121 includes a gate electrode, a source electrode, and a drain electrode. The gate electrode of the third transistor T3 is connected to the first low-clock signal line, and the source electrode and the drain electrode are connected between the first output terminal of the previous stage ST(n−1) and a Q2 node. The third transistor T3 may be turned on by the first low-clock signal LCLK1 and may transmit the first scan signal SCAN1 (*n*−1) output from the previous stage ST(n−1) to the Q2 node and the Q node.

In addition, for another stage ST connected to the second low-clock signal line instead of the first low-clock signal line, for example, the stage ST in the $(n+1)^{th}$ row, the third transistor T3 may be turned on by the second low-clock signal LCLK2.

The fourth transistor T4 of the logic unit 121 includes a gate electrode, a source electrode, and a drain electrode. The gate electrode of the fourth transistor T4 is connected to the Q node, and the source electrode and the drain electrode thereof are connected between a second gate-low line from which the second gate-low voltage VGL2 is output and the QB node. While the first scan signal SCAN1(*n*) is output, the fourth transistor T4 may transmit the second gate-low voltage VGL2 to the QB node to maintain the second transistor T2 in the turned-on state.

The fifth transistor T5 of the logic unit 121 includes a gate electrode, a source electrode, and a drain electrode. The gate electrode of the fifth transistor T5 is connected to the Q2 node, and the source electrode and the drain electrode thereof are connected to the gate-high line and the QB node. When the first scan signal SCAN1(*n*) is not output, the fifth transistor T5 may transmit the gate-high voltage VGH to the QB node to turn off the second transistor T2, and it is possible to prevent the gate-high voltage VGH from being transmitted to the first output terminal.

The first auxiliary transistor Ta1 of the logic unit 121 includes a gate electrode, a source electrode, and a drain electrode. The gate electrode of the first auxiliary transistor Ta1 is connected to the first gate-low line from which the first gate-low voltage VGL1 is output, and the source electrode and the drain electrode are connected between the Q2 node and the Q node. The first auxiliary transistor Ta1 may have the gate electrode connected to the first gate-low line and always remain turned on. The first auxiliary transistor Ta1 can keep the voltages at the Q2 node and the Q node substantially the same, and can prevent the voltage from leaking from the Q node to the Q2 node.

The sixth transistor T6 of the second output unit 123 includes a gate electrode, a source electrode, and a drain electrode. The gate electrode of the sixth transistor T6 is connected to the first output terminal of the first output unit 122, and the source electrode and the drain electrode are connected between the first gate-low line and the second output terminal from which the second scan signal SCAN2(*n*) is output. The sixth transistor T6 is turned on only when the first scan signal SCAN1(*n*) is not output to transmit the first gate-low voltage VGL1 to the second output terminal.

The seventh transistor T7 of the second output unit 123 includes a gate electrode, a source electrode, and a drain electrode. The gate electrode of the seventh transistor T7 is connected to the QN node, and the source electrode and the drain electrode thereof are connected between the first high-clock signal line and the second output terminal. The seventh transistor T7 may be turned on by the voltage at the QN node to transmit the first high-clock signal HCLK1 to the second output terminal, and the first high-clock signal HCLK1 may be output as the second scan signal SCAN2(*n*).

In addition, for another stage ST connected to the second high-clock signal line instead of the first high-clock signal line, for example, the stage ST in the $(n+1)^{th}$ row, when the seventh transistor T7 is turned on, the second high-clock signal HCLK2 may be transmitted to the second output terminal.

The second auxiliary transistor Ta2 of the second output unit 123 includes a gate electrode, a source electrode, and a drain electrode. The gate electrode of the second auxiliary transistor Ta2 is connected to the first gate-low line, and the source electrode and the drain electrode are connected between the QB node and the QN node. The second auxiliary transistor Ta2 having the gate electrode connected to the first gate-low line to always remain turned on may transmit the voltage at the QB node to the voltage at the QN node. In addition, the second auxiliary transistor Ta2 can prevent the voltage at the QN node from leaking toward the QB node.

The second capacitor CQN of the second output unit 123 is connected between the QN node and the second output terminal. The second capacitor CQN may store the voltage at the QN node. While the second scan signal SCAN2(*n*) is output, the second capacitor CQN may store the voltage at the QN node to maintain the seventh transistor T7 in the turned-on state.

Figure 5:
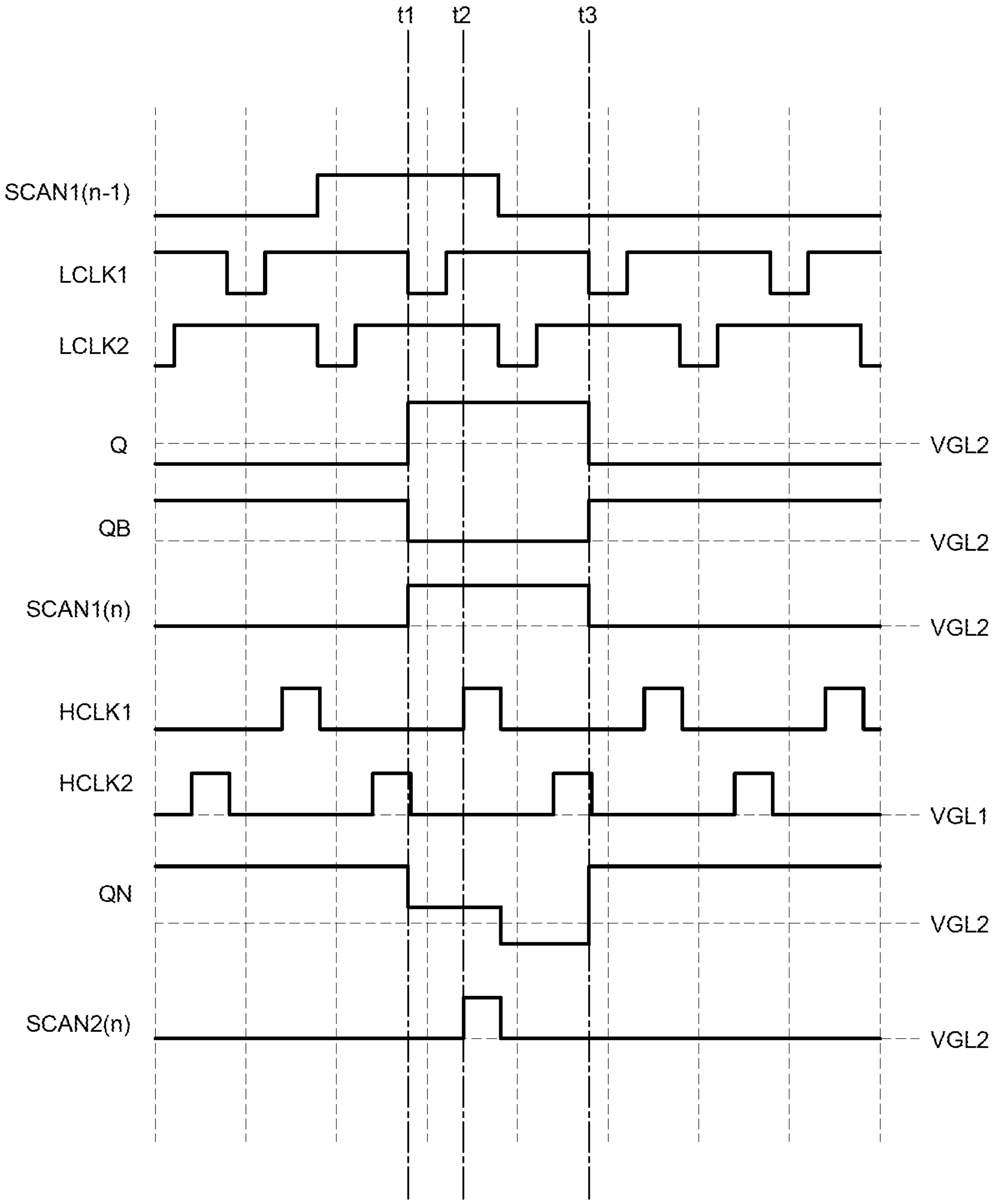
FIG. 5 is a timing diagram of a stage of a display device according to an example embodiment of the present disclosure.

Referring to FIG. 5, the first output unit 122 may output a first scan signal SCAN1(*n*) from a first time t1 to a third time t3. First, the first low-clock signal LCLK1 is output at the first time t1 during a period in which the high-level first scan signal SCAN1(*n*−1) is output in the previous stage ST(n−1). In this instance, the third transistor T3 turned on by the first low-clock signal LCLK1 may transmit the first scan signal SCAN1(*n*−1) of the previous stage ST(n−1) to the Q node. The high-level first scan signal SCAN1(*n*−1) may be stored in the first capacitor CQ. In addition, the fourth transistor T4 having the gate electrode connected to the Q node is turned on by the first scan signal SCAN1(*n*−1) of the previous stage ST(n−1) to transmit the second gate-low voltage VGL2 to the QB node. Accordingly, the second transistor T2 of the first output unit 122 may be turned on by the second gate-low voltage VGL2 transmitted to the QB node, and the turned-on second transistor T2 may output the gate-high voltage VGH to the first output terminal.

Accordingly, the first output unit 122 may output the gate-high voltage VGH transferred through the second transistor T2 turned-on until the third time t3 at which the next first low-clock signal LCLK1 is output to the first output terminal as the first scan signal SCAN1(*n*). Therefore, the length of the first scan signal SCAN1(*n*) may be equal to the interval of outputting the first low-clock signal LCLK1. For example, the interval from the time when one first low clock signal LCLK1 is output to the time when the next first low clock signal LCLK1 is output may be equal to the length of the first scan signal SCAN1(*n*).

Accordingly, the second output unit 123 may output the first high-clock signal HCLK1 output at a second time t2 as the second scan signal SCAN2(*n*). First, the first high-clock signal HCLK1 is output at the second time t2 between the first time t1 and the third time t3 at which the first scan signal SCAN1(*n*) is output. The second gate-low voltage VGL2 applied to the QB node at the first time t1 may be transmitted to the QN node connected to the QB node. Accordingly, the seventh transistor T7 having the gate electrode connected to the QN node is turned on to transmit the first high-clock signal HCLK1 to the second output terminal. In this instance, the length of the second scan signal SCAN2(*n*) may be equal to the length of one first high-clock signal HCLK1. Accordingly, the second output unit 123 may output the first high-clock signal HCLK1 output at the second time t2 as the second scan signal SCAN2(*n*).

At this time, the QN node may change to a voltage lower than the second gate-low voltage VGL2 due to the bootstrapping of the second capacitor CQN connected to the QN node. Accordingly, the voltage at the QN node becomes lower, and the seventh transistor T7 can stably remain turn on while the second scan signal SCAN2(*n*) is output.

In addition, during the first time t1 to the third time t3, the sixth transistor T6 having the gate electrode connected to the first output terminal may remain turned off by the high-level first scan signal SCAN1(*n*). Accordingly, while the second scan signal SCAN2(*n*) is output, the first gate-low voltage VGL1 is not transmitted to the second output terminal.

Accordingly, in the display device 100 according to the example embodiment of the present disclosure, the first output unit 122 and the second output unit 123 of a single stage ST(n) of the gate driver 120 may share the single logic unit 121 to generate the first scan signal SCAN1(*n*) and the second scan signal SCAN2(*n*). The first output unit 122 may be connected to the logic unit 121 to output the first scan signal SCAN1(*n*). Specifically, the first transistor T1 of the first output unit 122 may be turned off based on the first scan signal SCAN1(*n*−1) of the previous stage ST(n−1) transmitted to the Q node from the logic unit 121. At the same time, the second transistor T2 of the first output unit 122 may be turned on by the second gate-low voltage VGL2 transmitted to the QB node through the fourth transistor T4 of the logic unit 121, and may transmit the gate-high voltage VGH to the first output terminal to output the first scan signal SCAN1 (*n*). In addition, while the sixth transistor T6 of the second output unit 123 remains turned off by the first scan signal SCAN1(*n*) output from the first output unit 122, the seventh transistor T7 may remain turned on by the second gate-low voltage VGL2 transmitted to the QN node from the QB node and may output the first high-clock signal HCLK1 as the second scan signal SCAN2(*n*). Accordingly, in the display device 100 according to the example embodiment of the present disclosure, it is possible to generate the first scan signal SCAN1 and the second scan signal SCAN2 in the single stage ST including the logic unit 121, the first output unit 122 and the second output unit 123 connected with one another. Therefore, it is possible to generate the first scan signal SCAN1 and the second scan signal SCAN2 in the single stage ST without additionally forming a circuit for generating the first scan signal SCAN1 and a circuit for generating the second scan signal SCAN2, so that the structure of the gate driver 120 can become simpler, and the bezel can be reduced easily.

In the display device 100 according to the example embodiment of the present disclosure, the driving timing for outputting the first scan signal SCAN1 can be directly applied for outputting the second scan signal SCAN2, so that the gate driver 120 can be driven more simply. First, in the first output unit 122 and the logic unit 121, the first scan signal SCAN1(*n*) may be output by the first scan signal SCAN1(*n*−1) of the previous stage ST(n−1) and the low-clock signals LCLK1 and LCLK2. At this time, the second output unit 123 connected to the first output unit 122 and the logic unit 121 may output the second scan signal SCAN2(*n*) based on the voltage transmitted from the first output unit 122 and the logic unit 121. For example, the second output unit 123 may output the second scan signal SCAN2(*n*) based on the first scan signal SCAN1(*n*) transmitted from the first output unit 123 and the second gate-low voltage VGL2 transmitted to the QN node from the logic unit 121. Accordingly, the sixth transistor T6 and the seventh transistor T7 of the second output unit 123 are turned on or off with the voltages of the first output unit 122 and the logic unit 121 to thereby output the second scan signal SCAN2(*n*). As described above, in the display device 100 according to the example embodiment of the present disclosure, the driving timing for outputting the first scan signal SCAN1 may be directly applied to the second output unit 123, so that the gate driver 120 can be driven more simply.

The example embodiments of the present disclosure can also be described as follows:

According to an aspect of the present disclosure, there is provided a display device. The display device includes a display panel having a plurality of sub-pixels defined thereon, the sub-pixels being connected to a plurality of scan lines and a plurality of data lines, and a gate driver comprising a plurality of stages for supplying first and second scan signals at a high-level to each of the plurality of scan lines. Each of the plurality of stages comprises a first output unit for outputting the first scan signal, a second output unit for outputting the second scan signal, a logic unit connected to the first output unit and the second output unit, a low-clock signal line for outputting a low-clock signal at a low-level and connected to the logic unit, and a high-clock signal line for outputting a high-clock signal at a high-level and connected to the second output unit.

The first output unit may include a first transistor having a gate electrode connected to a Q node, and a source electrode and a drain electrode connected between a gate-low line and a first output terminal from which the first scan signal is output, and a second transistor having a gate electrode connected to a QB node, and a source electrode and a drain electrode connected between a gate-high line and the first output terminal.

The logic unit may include a third transistor having a gate electrode connected to the low-clock signal line and a source electrode and a drain electrode connected between the Q node and the first output terminal of a previous stage among the plurality of stages, a fourth transistor having a gate electrode connected to the Q node, and a source electrode and a drain electrode connected between the gate-low line and the QB node, and a fifth transistor having a source electrode and a drain electrode connected between the gate-high line and the QB node, wherein the third transistor and the fifth transistor are p-type transistors, and the fourth transistor is an n-type transistor.

When the third transistor is turned on and the first scan signal output from the previous stage is transmitted to the Q node, the fourth transistor may be turned on to transmit a gate-low voltage from the gate-low line to the QB node, and the second transistor may be turned on by the gate-low voltage at the QB node to transmit the gate-high voltage from the gate-high line to the first output terminal.

The second output unit may include a sixth transistor having a gate electrode connected to the first output terminal, and a source electrode and a drain electrode connected between the gate-low line and a second output terminal from which the second scan signal is output, and a seventh transistor having a gate electrode connected to a QN node, and a source electrode and a drain electrode connected between a high-clock signal line and the second output terminal, and the QN node may be electrically connected to the QB node.

When the first scan signal is output from the first output terminal and the sixth transistor is turned off, the seventh transistor may be turned on by the gate-low voltage at the QB node to transmit the high-clock signal to the second output terminal.

A length of the first scan signal may be equal to an interval of outputting the low-clock signal, and a length of the second scan signal may be equal to a length of the single high-clock signal.

The first output unit may further include a first capacitor connected between the Q node and the first output terminal, and the first capacitor may store the voltage at the Q node to maintain the first transistor in a turn-off state when the first scan signal is output.

The second output unit may further include a second capacitor connected between the QN node and the second output terminal, and the second capacitor may store the voltage transmitted from the QB node to the QN node to maintain the seventh transistor in a turn-on state when the second scan signal is output.

The low-clock signal line may include a first low-clock signal line connected to an odd-numbered stage among the plurality of stages, and a second low-clock signal line connected to an even-numbered stage among the plurality of stages. The third transistor of the logic unit may be turned on by a first low-clock signal from the first low-clock signal line or a second low-clock signal from the second low-clock signal line.

The high-clock signal line may include a first high-clock signal line connected to an odd-numbered stage among the plurality of stages, and a second high-clock signal line connected to an even-numbered stage among the plurality of stages, and the seventh transistor of the second output unit may output the first high-clock signal from the first high-clock signal line or the second high-clock signal from the second high-clock signal line as the second scan signal when it is turned on.

Each of the plurality of sub-pixels may include a driving transistor having a gate electrode connected to a first node, a source electrode connected to a second node, and a drain electrode connected to a third node, a first pixel transistor having a gate electrode connected to the plurality of scan lines, and a source electrode and a drain electrode connected between the first node and a third node, and a second pixel transistor having a gate electrode connected to the plurality of scan lines, and a source electrode and a drain electrode connected between the second node and the plurality of data lines. The first pixel transistor may be an n-type oxide semiconductor transistor turned on by the first scan signal output from the plurality of scan lines, and the second pixel transistor may be an n-type oxide semiconductor transistor turned on by the second scan signal output from the plurality of scan lines.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel having a plurality of sub-pixels defined thereon, the plurality of sub-pixels being connected to a plurality of scan lines and a plurality of data lines; and a gate driver comprising a plurality of stages for supplying first and second scan signals at a high-level to each of the plurality of scan lines, wherein each of the plurality of stages comprises:

a first output unit for outputting the first scan signal;

a second output unit for outputting the second scan signal;

a logic unit connected to the first output unit and the second output unit;

a low-clock signal line for outputting a low-clock signal at a low-level and connected to the logic unit; and a high-clock signal line for outputting a high-clock signal at a high-level and connected to the second output unit, wherein the first output unit comprises:

a first transistor having a gate electrode connected to a Q node, and a source electrode and a drain electrode connected between a second gate-low line and a first output terminal from which the first scan signal is output; and a second transistor having a gate electrode connected to a QB node, and a source electrode and a drain electrode connected between a gate-high line and the first output terminal, and wherein the second output unit includes:

a six transistor having a gate electrode connected to the first output terminal, and a source electrode and a drain electrode connected between a first gate-low line and a second output terminal from which the second scan signal is output.

2. The display device of claim 1, wherein the logic unit comprises:

a third transistor having a gate electrode connected to the low-clock signal line and a source electrode and a drain electrode connected between the Q node and the first output terminal of a previous stage among the plurality of stages;

a fourth transistor having a gate electrode connected to the Q node, and a source electrode and a drain electrode connected between the second gate-low line and the QB node; and a fifth transistor having a source electrode and a drain electrode connected between the gate-high line and the QB node, wherein the third transistor and the fifth transistor are p-type transistors, and the fourth transistor is an n-type transistor.

3. The display device of claim 2, wherein when the third transistor is turned on and the first scan signal output from the previous stage is transmitted to the Q node, the fourth transistor is turned on to transmit a gate-low voltage from the second gate-low line to the QB node, and the second transistor is turned on by the gate-low voltage at the QB node to transmit the gate-high voltage from the gate-high line to the first output terminal.

4. The display device of claim 3, wherein the second output unit comprises: a seventh transistor having a gate electrode connected to a QN node, and a source electrode and a drain electrode connected between the high-clock signal line and the second output terminal, and wherein the QN node is electrically connected to the QB node.

5. The display device of claim 4, wherein when the first scan signal is output from the first output terminal and the sixth transistor is turned off, the seventh transistor is turned on by the gate-low voltage at the QB node to transmit the high-clock signal to the second output terminal.

6. The display device of claim 5, wherein a length of the first scan signal is equal to an interval of outputting the low-clock signal, and wherein a length of the second scan signal is equal to a length of the single high-clock signal.

7. The display device of claim 4, wherein the first output unit further comprises a first capacitor connected between the Q node and the first output terminal, and wherein the first capacitor stores a voltage at the Q node to maintain the first transistor in a turn-off state when the first scan signal is output.

8. The display device of claim 4, wherein the second output unit further comprises a second capacitor connected between the QN node and the second output terminal, and wherein the second capacitor stores a voltage transmitted from the QB node to the QN node to maintain the seventh transistor in a turn-on state when the second scan signal is output.

9. The display device of claim 4, wherein the low-clock signal line comprises:

a first low-clock signal line connected to an odd-numbered stage among the plurality of stages; and a second low-clock signal line connected to an even-numbered stage among the plurality of stages, and wherein the third transistor of the logic unit is turned on by a first low-clock signal from the first low-clock signal line or a second low-clock signal from the second low-clock signal line.

10. The display device of claim 4, wherein the high-clock signal line comprises:

a first high-clock signal line connected to an odd-numbered stage among the plurality of stages; and a second high-clock signal line connected to an even-numbered stage among the plurality of stages, and wherein the seventh transistor of the second output unit outputs the first high-clock signal from the first high-clock signal line or the second high-clock signal from the second high-clock signal line as the second scan signal when it is turned on.

11. The display device of claim 1, wherein each of the plurality of sub-pixels comprises:

a driving transistor having a gate electrode connected to a first node, a source electrode connected to a second node, and a drain electrode connected to a third node;

a first pixel transistor having a gate electrode connected to the plurality of scan lines, and a source electrode and a drain electrode connected between the first node and a third node; and a second pixel transistor having a gate electrode connected to the plurality of scan lines, and a source electrode and a drain electrode connected between the second node and the plurality of data lines, wherein the first pixel transistor is an n-type oxide semiconductor transistor turned on by the first scan signal output from the plurality of scan lines, and wherein the second pixel transistor is an n-type oxide semiconductor transistor turned on by the second scan signal output from the plurality of scan lines.

12. A gate driver comprising a plurality of stages, each being configured to output first and second scan signals and comprising:

a first transistor having a gate electrode connected to a Q node, and a source electrode and a drain electrode connected between a second gate-low line and a first output terminal from which the first scan signal is output;

a second transistor having a gate electrode connected to a QB node, and a source electrode and a drain electrode connected between a gate-high line and the first output terminal;

a third transistor having a gate electrode connected to a low-clock signal line and a source electrode and a drain electrode connected between the Q node and a first output terminal of a previous stage among the plurality of stages;

a fourth transistor having a gate electrode connected to the Q node, and a source electrode and a drain electrode connected between the second gate-low line and the QB node;

a fifth transistor having a source electrode and a drain electrode connected between the gate-high line and the QB node;

a sixth transistor having a gate electrode connected to the first output terminal, and a source electrode and a drain electrode connected between a first gate-low line and a second output terminal from which the second scan signal is output; and a seventh transistor having a gate electrode connected to a QN node, and a source electrode and a drain electrode connected between a high-clock signal line and the second output terminal, wherein the QN node is electrically connected to the QB node, wherein the first transistor, the second transistor, the third transistor, the fifth transistor, the six transistor and the second transistor are p-type transistors, and the fourth transistor is an n-type transistor.

13. The gate driver of claim 12, wherein each of the plurality of stages further comprises:

a first capacitor connected between the Q node and the first output terminal; and a second capacitor connected between the QN node and the second output terminal.

14. The gate driver of claim 13, wherein each of the plurality of stages further comprises:

a first auxiliary transistor having a gate electrode connected to the first gate-low line, and a source electrode and a drain electrode connected between the drain electrode of the third transistor and the Q node; and a second auxiliary transistor having a gate electrode connected to the first gate-low line, and a source electrode and a drain electrode connected between the QB node and the QN node.

* * * * *